(12) United States Patent
Ross et al.

(10) Patent No.: US 11,860,912 B2
(45) Date of Patent: Jan. 2, 2024

(54) ANSWERABILITY-AWARE OPEN-DOMAIN QUESTION ANSWERING

(71) Applicant: Ford Global Technologies, LLC, Dearborn, MI (US)

(72) Inventors: Lucas Ross, Royal Oak, MI (US); Romil Shah, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 17/212,422

(22) Filed: Mar. 25, 2021

(65) Prior Publication Data

US 2022/0309086 A1    Sep. 29, 2022

(51) Int. Cl.
*G06F 16/332* (2019.01)
*G06F 16/33* (2019.01)
*G06F 16/338* (2019.01)

(52) U.S. Cl.
CPC ........ *G06F 16/3329* (2019.01); *G06F 16/338* (2019.01); *G06F 16/3344* (2019.01)

(58) Field of Classification Search
CPC .................................................. G06F 16/3329
See application file for complete search history.

(56) References Cited

U.S. PATENT DOCUMENTS

| | | | |
|---|---|---|---|
| 7,454,393 B2 | 11/2008 | Horvitz et al. | |
| 10,255,349 B2 | 4/2019 | Guggilla et al. | |
| 11,227,218 B2* | 1/2022 | Min | G06F 40/20 |
| 2007/0067293 A1* | 3/2007 | Yu | G06F 16/3346 |

FOREIGN PATENT DOCUMENTS

CN    108717413 A    10/2018

* cited by examiner

*Primary Examiner* — Van H Oberly
(74) *Attorney, Agent, or Firm* — Brandon Hicks; Bejin Bieneman PLC

(57) ABSTRACT

A system comprises an input interface to receive input indicating a question, a communication module to establish a communication link with an access network, wherein the communication link provides connectivity to one or more packet data networks (PDNs) via the access network, and a computer coupled to the input interface and the communication module, the computer including a processor and a memory, the memory storing instructions executable by the processor to execute an information retrieval procedure including accessing an open-domain context search space of the one or more PDNs and retrieving, from among a plurality of contexts of the open-domain context search space, a plurality of candidate contexts for answering the question using a question-answering model for open-domain question answering, identify a set of non-answering contexts among the plurality of candidate contexts, wherein each of the set of non-answering contexts is a respective context for which the question-answering model predicts the question to be unanswerable, determine an open-domain unanswerability score for the question based on respective relevance scores for the set of non-answering contexts, determine an open-domain result for the question based on the open-domain unanswerability score for the question, and output result information indicating the open-domain result for the question.

25 Claims, 5 Drawing Sheets

ANSWERABILITY-AWARE OPEN-DOMAIN QUESTION ANSWERING

BACKGROUND

In the field of natural-language processing, question answering is a topic of emerging interest. A question-answering process involves searching for an answer to a natural language question. The ability to determine and provide answers to natural language questions in an automated fashion can offer benefits in a wide variety of applications.

DETAILED DESCRIPTION

Figure 1:
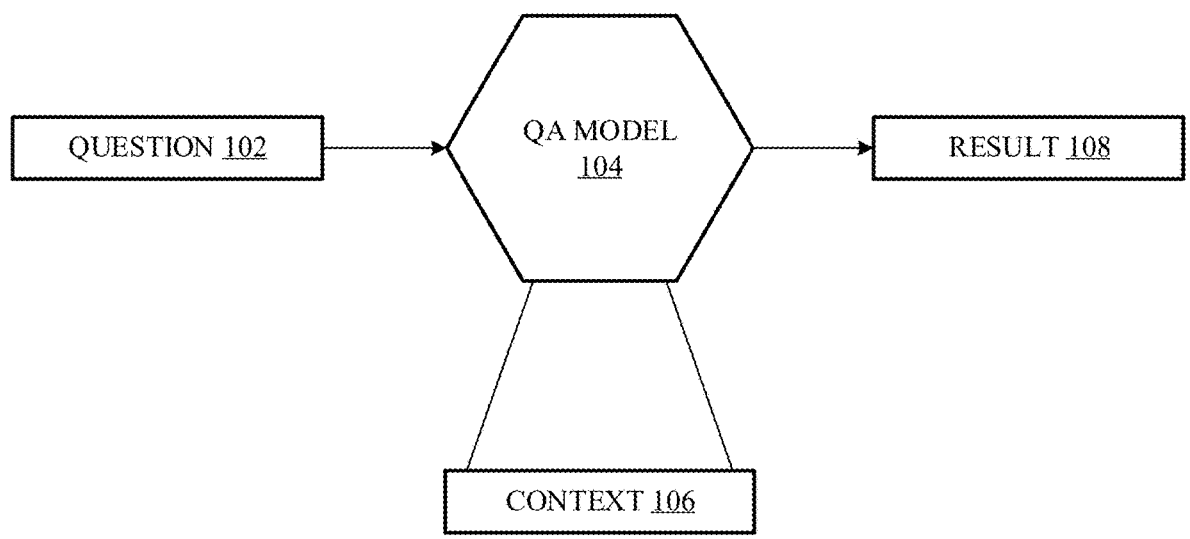
FIG. 1 is a block diagram of an example question-answering process.

In a closed-domain question-answering process, a closed corpus comprising a specific context or set of contexts is searched for an answer to a question (e.g., a natural language question). A question-answering model is applied in order to identify a candidate answer within a context of the closed corpus. In order to avoid returning erroneous or nonsensical answers in cases in which correct/suitable answers are not present within the closed corpus, the process can be designed to be answerability-aware. To this end, in conjunction with searching a context for an answer to a question, the answerability of the question via that context can be assessed. This assessment can involve, for example, determining an unanswerability score for the question with respect to the context, and concluding that the question is unanswerable by the context if the unanswerability score exceeds a threshold. If the assessment indicates that the question is unanswerable by the closed corpus, a value indicating unanswerability can be returned as a result, rather than a purported answer.

The use of a closed corpus as the search domain can impose constraints upon the breadth and depth of coverage provided with respect to the variety of topics and associated questions for which answers can be identified. If the set of contexts to be searched in a closed-domain question-answering process includes more than a relatively small number of contexts, the process can be too computationally expensive to be a suitable for use in many potential usage scenarios. In order to increase the likelihood of finding suitable answers, as well as the quality of such answers, it may be desirable to implement an open-domain question-answering process. In an open-domain question answering process, the search is conducted over an open corpus comprising thousands or millions of contexts (or more). An information retrieval (IR) model can be used to retrieve candidate contexts from the open corpus, and a question-answering model can be run on the candidate contexts. The search space is open-ended, in that no specific limitations are placed upon the number or identity of contexts that can be considered for retrieval and evaluation.

Implementing an open-domain question answering process can present an issue with respect to question answerability. The question-answering model may be relatively accurate in detecting unanswerability with respect to any given context. Thus, in the case of fundamentally unanswerable questions—questions that are unanswerable regardless of context (e.g., nonsensical questions, incomprehensible questions, etc.)—a closed-domain process may be unlikely to return an erroneous answer (rather than a result indicating unanswerability). However, as the number of different contexts for which answerability is assessed increases, the likelihood may increase that the model "misses" the unanswerability of the question by one or more of those contexts. With respect to an open-domain search space, due to the sheer number of contexts considered, the likelihood that the model erroneously identifies a context as containing an answer to an in-fact unanswerable question may be undesirably high.

Disclosed herein are techniques for answerability-aware open-domain question answering that can be implemented in order to realize the benefits (e.g., improvements in answer quality and/or likelihood of identifying suitable answers) of searching an open corpus, in a manner that enables the accurate detection of unanswerable questions. According to such techniques, the answerability of questions can be evaluated over the open-domain context search space. This evaluation can take the relevance of the various contexts into account in conjunction with assessing the open-domain answerability of the question based on the answerability of the question by the various contexts. Implementing such answerability-aware open-domain question answering techniques can improve answer quality and increase the likelihood of finding suitable answers to received questions (including questions that are locally unanswerable in many or most contexts, but globally answerable in that an answer exists in at least one context), while allowing detection of questions that are unanswerable.

Disclosed herein is a system, comprising an input interface to receive input indicating a question, a communication module to establish a communication link with an access network, wherein the communication link provides connectivity to one or more packet data networks (PDNs) via the access network, and a computer coupled to the input interface and the communication module, the computer including a processor and a memory, the memory storing instructions executable by the processor to execute an information retrieval procedure including accessing an open-domain context search space of the one or more PDNs and retrieving, from among a plurality of contexts of the open-domain context search space, a plurality of candidate contexts for answering the question using a question-answering model for open-domain question answering, identify a set of non-answering contexts among the plurality of candidate contexts, wherein each of the set of non-answering contexts is a respective context for which the question-answering model predicts the question to be unanswerable, determine an open-domain unanswerability score for the question based on respective relevance scores for the set of non-answering contexts, determine an open-domain result for the question based on the open-domain unanswerability score for the question, and output result information indicating the open-domain result for the question.

The memory can store instructions executable by the processor to determine a set of adjusted unanswerability scores including a respective adjusted unanswerability score for each of the set of non-answering contexts, and determine the open-domain unanswerability score for the question based on the set of adjusted unanswerability scores.

The memory can store instructions executable by the processor to determine each of the set of adjusted unanswerability scores based on a normalized unanswerability score for a respective non-answering context among the set of non-answering contexts and a relevance score for the respective non-answering context.

The memory can store instructions executable by the processor to determine each of the set of adjusted unanswerability scores as a weighted average of the normalized unanswerability score for the respective non-answering context and the relevance score for the respective non-answering context.

The memory can store instructions executable by the processor to identify a smallest adjusted unanswerability score among the set of unanswerability scores as the open-domain unanswerability score for the question.

The memory can store instructions executable by the processor to determine the open-domain result for the question based on a comparison of the open-domain unanswerability score with a threshold value.

The memory can store instructions executable by the processor to, in response to a determination that the open-domain unanswerability score exceeds the threshold value, identify an unanswerability result as the open-domain result for the question, and arrange the result information to indicate the unanswerability result.

The memory can store instructions executable by the processor to, in response to a determination that the open-domain unanswerability score does not exceed the threshold value, identify an answer span as the open-domain result for the question, wherein the answer span is contained in an answering context among the set of candidate contexts, and arrange the result information to indicate the answer span.

The memory can store instructions executable by the processor to select the plurality of candidate contexts from among the plurality of contexts of the open-domain context search space based on respective relevance scores for the plurality of candidate contexts.

The memory can store instructions executable by the processor to output the result information to a human-machine interface (HMI).

Further disclosed herein is a method, comprising receiving input indicating a question, establishing a communication link with an access network, wherein the communication link provides connectivity to one or more packet data networks (PDNs) via the access network, executing an information retrieval procedure including accessing an open-domain context search space of the one or more PDNs and retrieving, from among a plurality of contexts of the open-domain context search space, a plurality of candidate contexts for answering the question using a question-answering model for open-domain question answering, identifying a set of non-answering contexts among the plurality of candidate contexts, wherein each of the set of non-answering contexts is a respective context for which the question-answering model predicts the question to be unanswerable, determining an open-domain unanswerability score for the question based on respective relevance scores for the set of non-answering contexts, determining an open-domain result for the question based on the open-domain unanswerability score for the question, and outputting result information indicating the open-domain result for the question.

The method can comprise determining a set of adjusted unanswerability scores including a respective adjusted unanswerability score for each of the set of non-answering contexts, and determining the open-domain unanswerability score for the question based on the set of adjusted unanswerability scores.

The method can comprise determining each of the set of adjusted unanswerability scores based on a normalized unanswerability score for a respective non-answering context among the set of non-answering contexts and a relevance score for the respective non-answering context.

The method can comprise determining each of the set of adjusted unanswerability scores as a weighted average of the normalized unanswerability score for the respective non-answering context and the relevance score for the respective non-answering context.

The method can comprise identifying a smallest adjusted unanswerability score among the set of unanswerability scores as the open-domain unanswerability score for the question.

The method can comprise determining the open-domain result for the question based on a comparison of the open-domain unanswerability score with a threshold value.

The method can comprise, in response to a determination that the open-domain unanswerability score exceeds the threshold value, identifying an unanswerability result as the open-domain result for the question, and arranging the result information to indicate the unanswerability result.

The method can comprise, in response to a determination that the open-domain unanswerability score does not exceed the threshold value, identifying an answer span as the open-domain result for the question, wherein the answer span is contained in an answering context among the set of candidate contexts, and arranging the result information to indicate the answer span.

The method can comprise selecting the plurality of candidate contexts from among the plurality of contexts of the open-domain context search space based on respective relevance scores for the plurality of candidate contexts.

The method can comprise outputting the result information to a human-machine interface (HMI).

FIG. 1 is a block diagram of an example question-answering process 100. In question-answering process 100, a question-answering (QA) model 104 is used to attempt to provide an answer to a question 102. According to the QA model 104, a context 106 is searched in order to look for an answer to question 102. A result 108 is generated based on the outcome of the search of context 106.

The search of context 106 for an answer to question 102 produces an answer span A and an associated answer confidence score $S_A$ for that answer span A. The answer span A comprises a span of text from context 106, and represents a "best guess" as to an answer to question 102 given the information in context 106. The answer confidence score $S_A$ represents a relative measure of confidence that the answer span A constitutes a valid/correct answer to question 102.

Depending on the nature of question 102 and context 106, there may or may not be an answer span in context 106 that constitutes a suitable answer to question 102. If question 102 pertains to a topic outside the scope of context 106, then the answer span A identified via the search of context 106 may amount to a nonsensical answer to question 102.

QA model 104 can be designed to avoid returning such nonsensical answers by assessing the answerability of question 102 via context 106. To this end, in conjunction with the search of context 106, QA model 104 can determine an unanswerability score $S_U$ in addition to answer span A and answer confidence score $S_A$. Unanswerability score $S_U$ can represent a relative measure of estimated likelihood that question 102 is unanswerable using context 106. The unanswerability score $S_U$ can be compared to a threshold $\tau$. If the unanswerability score $S_U$ exceeds the threshold $\tau$, then an unanswerable value "(unanswerable)" can be returned as result 108. Otherwise, answer span A can be returned as result 108.

Question-answering process 100 represents an example of a closed-domain question-answering process. According to a closed-domain question-answering process, a single context (e.g., context 106 of FIG. 1) is searched for an answer to the question. In order to increase the likelihood of finding answers to received questions, it may be desirable to implement an open-domain question-answering process. According to an open-domain question-answering process, many contexts may be searched for an answer to the question. For example, a given open-domain question-answering process may involve searching a knowledgebase consisting of thousands or even millions of contexts.

Even given such large numbers of contexts, it may still be the case, for some questions, that the QA model cannot identify an answer span that constitutes a suitable answer. In order to avoid returning nonsensical answers, it may therefore be desirable that the open-domain question-answering process be answerability-aware, such that it assesses the answerability of the questions it evaluates given the contexts that are searched.

Figure 2:
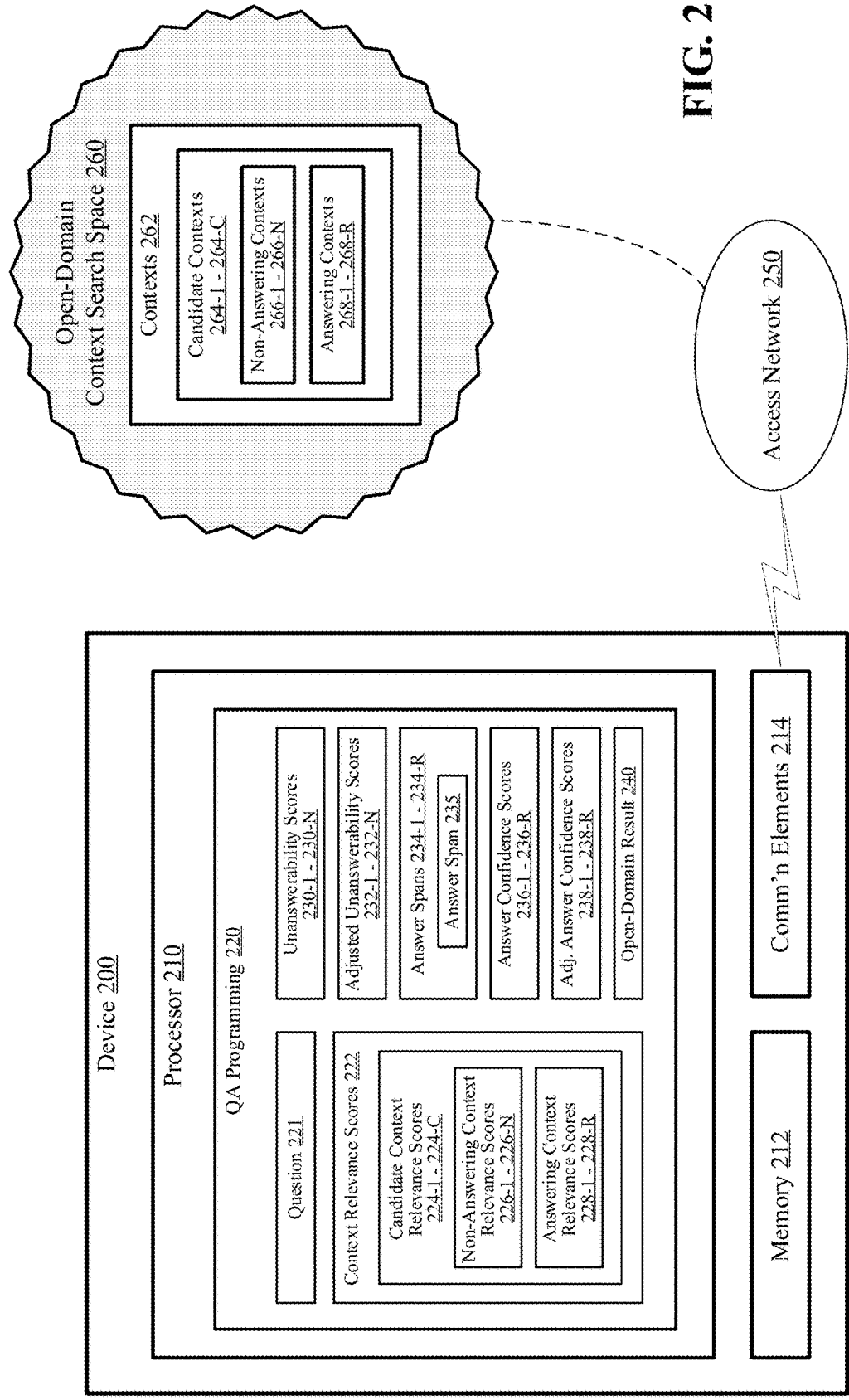
FIG. 2 is a block diagram of an example device.

FIG. 2 is a block diagram of an example device 200 that may implement answerability-aware open-domain question answering. As shown in FIG. 2, device 200 can include a processor 210, memory 212, and communication elements 214.

In some implementations, processor 210 can be a general-purpose processor. In some implementations, device 200 can be (or include) a microcontroller, and processor 210 can represent processing circuitry of that microcontroller. In some implementations, processor 210 can be a graphics processing unit (GPU). In some implementations, processor 210 can be (or include) a dedicated electronic circuit including an ASIC that is manufactured for a particular operation, e.g., an ASIC for processing sensor data and/or communicating the sensor data. In another example, processor 302 can be (or include) an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in processor 210.

Memory 212 can include one or more forms of computer-readable media, and can store instructions executable by processor 210 for performing various operations, including as disclosed herein.

Communication elements 214 are elements operable to send and/or receive communications over one or more communication links in accordance with one or more associated communication protocols. These can include wireless links/protocols, such as cellular, Wi-Fi, and/or Bluetooth® links/protocols, and can additionally or alternatively include wired links/protocols (e.g., Ethernet). Communication elements 214 can establish a connection with an access network 250 in order to provide device 200 with connectivity to one or more packet data networks (PDN), such as the Internet.

As shown in FIG. 2, device 200 can be communicatively coupled to a human-machine interface (HMI) 205. HMI 205 is equipment configured to accept user inputs for one or more computing devices, such as device 200, and/or to display/provide outputs from such devices. HMI 205 can include, for example, one or more of a display configured to provide a graphical user interface (GUI) or the like, an interactive voice response (IVR) system, audio output devices, mechanisms for providing haptic output, etc. In some implementations, HMI 205 can be comprised in device 200. For instance, in some implementations, device 200 can be a portable computing device such as a tablet computer, a smart phone, or the like, and HMI 205 can correspond to input and output functions/capabilities of that portable computing device.

Processor 210 can execute question answering (QA) programming 220. QA programming 220 is programming, e.g., software, that performs operations associated with question answering at device 200. These operations can include, for example, identifying questions to be answered, identifying contexts to be searched, determining results for such questions by searching such contexts, and outputting those results.

In the example depicted in FIG. 2, QA programming 220 identifies a question 221 for which to search for an answer using open-domain question answering. In some implementations, QA programming can identify question 221 based on question information received from HMI 205. In some implementations, such question information can reflect user input provided to/via HMI 205. In order to search for an answer to question 221 using open-domain question answering, QA programming 220 can access an open-domain context search space 260 comprising a plurality of contexts 262. In some implementations, device 200 may have access to the open-domain context search space 260 via PDN connectivity provided by a connection with access network 250, such as may be established by communication elements 214.

In conjunction with searching for an answer to question 221 using an answerability-aware open-domain questioning answering process, QA programming 220 can narrow the open-domain context search space 260 down into a smaller search space comprising a plurality of candidate contexts 264-1 to 264-C, where C is an integer greater than 1. In order to narrow the open-domain context search space 260, QA programming 220 can determine context relevance scores 222 for the contexts 262 of the open-domain context search space 260 based on question 221. Context relevance scores 222 can be relative indicators of the relevance of the various contexts 262 for the purpose of answering question 221. In some implementations, context relevance scores 222 can be information retrieval (IR) distance scores. Candidate contexts 264-1 to 264-C can be contexts among contexts 262 that are of relatively greater relevance for the purpose of answering question 221. QA programming 220 can identify/select candidate contexts 264-1 to 264-C based on candidate context relevance scores 224-1 to 224-C that comprise respective context relevance scores for candidate contexts 264-1 to 264-C.

QA programming 220 can identify, among candidate contexts 264-1 to 264-C, a set of non-answering contexts 266-1 to 266-N, where N is a positive integer. Each of non-answering contexts 266-1 to 266-N may be a respective context for which a QA model, such as QA model 104, predicts question 221 to be unanswerable (e.g., returns an "(unanswerable)" value as a result). QA programming 220 can identify non-answering contexts 266-1 to 266-N based on respective unanswerability scores 230-1 to 230-N for those contexts, as can be determined using the QA model.

QA programming 220 can normalize the set of unanswerability scores 230-1 to 230-N by applying min-max normalization, and can use the normalized unanswerability scores to determine a set of adjusted unanswerability scores 232-1 to 232-N. Each of adjusted unanswerability scores 232-1 to 232-N can be determined based on a normalized unanswerability score for a respective one of non-answering contexts 266-1 to 266-N and a relevance score (i.e., one of non-answering context relevance scores 226-1 to 226-N) for that non-answering context. In some implementations, each of adjusted unanswerability scores 232-1 to 232-N can be determined as a weighted average of a normalized unanswerability score for a respective one of non-answering contexts 266-1 to 266-N and a relevance score (i.e., one of non-answering context relevance scores 226-1 to 226-N) for that non-answering context. In some implementations, each of adjusted unanswerability scores 232-1 to 232-N can be determined according to Equation 1 as follows:

$$S'_{U_i} = \mu_U * N_m(\overline{S_U})_i + (1-\mu_U) * S_{IR_i} \quad (1)$$

where $\overline{S_U}$ represents a vector including unanswerability scores 230-1 to 230-N, $N_m(\overline{S_U})_i$ represents a min-max normalized unanswerability score for non-answering context i, $S_{IR_i}$ represents a relevance score for non-answering context i, $\mu_U$ represents a hyperparameter specifying a weighted average of unanswerability scores and context relevance scores, and $S'_{U_i}$ represents an adjusted unanswerability score for the non-answering context i.

QA programming 220 can determine an open-domain unanswerability score $\tilde{s}_U$ for question 221 based on adjusted unanswerability scores 232-1 to 232-N. In some implementations, QA programming 220 can determine the open-domain unanswerability score $\tilde{s}_U$ according to Equation 2 as follows:

$$\tilde{s}_U = \min_{i \in 1 \text{ to } n} S'_{U_i} \quad (2)$$

QA programming 220 can compare open-domain unanswerability score $\tilde{s}_U$ with a threshold value $\hat{\tau}$ in order to determine whether question 221 is unanswerable. If the open-domain unanswerability score $\tilde{s}_U$ exceeds the threshold value $\hat{\tau}$, QA programming 220 can determine that question 221 is unanswerable, and can identify an unanswerability result (e.g., "(unanswerable)") as an open-domain result 240 for question 221. QA programming 220 can then output result information to HMI 205, and can arrange the result information to indicate the unanswerability result.

In addition to non-answering contexts 266-1 to 266-N, QA programming 220 can identify a set of answering contexts 268-1 to 268-R among candidate contexts 264-1 to 264-C, where R is a positive integer. Each of answering contexts 264-1 to 264-R may be a respective context for which the QA model returns an answer to question 221 (as opposed to an unavailability result). If the open-domain unanswerability score $\tilde{s}_U$ does not exceed the threshold value $\hat{\tau}$, QA programming 220 can determine that question 221 is answerable, and can identify one of answer spans 234-1 to 234-R as the open-domain result 240 for question 221, where answer spans 234-1 to 234-R represent the respective answers returned by answering contexts 264-1 to 264-R.

QA programming 220 can determine a set of answer confidence scores 236-1 to 236-R, where each of answer confidence scores 236-1 to 236-R is an answer confidence score associated with one of answer spans 234-1 to 234-R corresponding to a respective one of answering contexts 268-1 to 268-R. QA programming 220 can normalize the set of answer confidence scores 236-1 to 236-R by applying min-max normalization. QA programming 220 can also apply min-max normalization to normalize a set of answering context relevance scores 228-1 to 228-R that includes a respective context relevance score for each of answering contexts 268-1 to 268-R.

QA programming 220 can use the normalized answer confidence scores and normalized context relevance scores to determine a set of adjusted answer confidence scores 238-1 to 238-R. Each of adjusted answer confidence scores 238-1 to 238-R can be determined based on a normalized answer confidence score for a respective one of answering contexts 268-1 to 268-R and a normalized context relevance score for that answering context. In some implementations, each of adjusted answer confidence scores 238-1 to 238-R can be determined as a weighted average of a normalized answer confidence score for a respective one of answering contexts 268-1 to 268-R and a normalized context relevance score for that answering context. In some implementations, each of adjusted answer confidence scores 238-1 to 238-R can be determined according to Equation 3 as follows:

$$S'_{A_i} = \mu_A * N_m(\overline{S_A})_i + (1-\mu_A) * (1 - N_m(\overline{S_{IR}})_i) \quad (3)$$

where $\overline{S_A}$ represents a vector including answer confidence scores 236-1 to 236-R, $N_m(\overline{S_A})_i$ represents a min-max normalized answer confidence score for answering context i, $\overline{S_{IR}}$ represents a vector including answering context relevance scores 228-1 to 228-R, $N_m(\overline{S_{IR}})$ represents a min-max normalized context relevance score for answering context i, $\mu_A$ represents a hyperparameter specifying a weighted average of answer confidence scores and context relevance scores, and $S'_{A_i}$ represents an adjusted answer confidence score for the answering context i.

Based on adjusted answer confidence scores 238-1 to 238-R, QA programming 220 can identify one of answer spans 234-1 to 234-R as the open-domain result 240 for question 221. In some implementations, QA programming 220 can identify a largest adjusted answer confidence score (among adjusted answer confidence scores 238-1 to 238-R), and can identify an answer span 235 corresponding to that largest adjusted answer confidence score as the open-domain result 240 for question 221. QA programming 220 can then output result information to HMI 205, and can arrange the result information to indicate answer span 235 as the answer to question 221.

Figure 3:
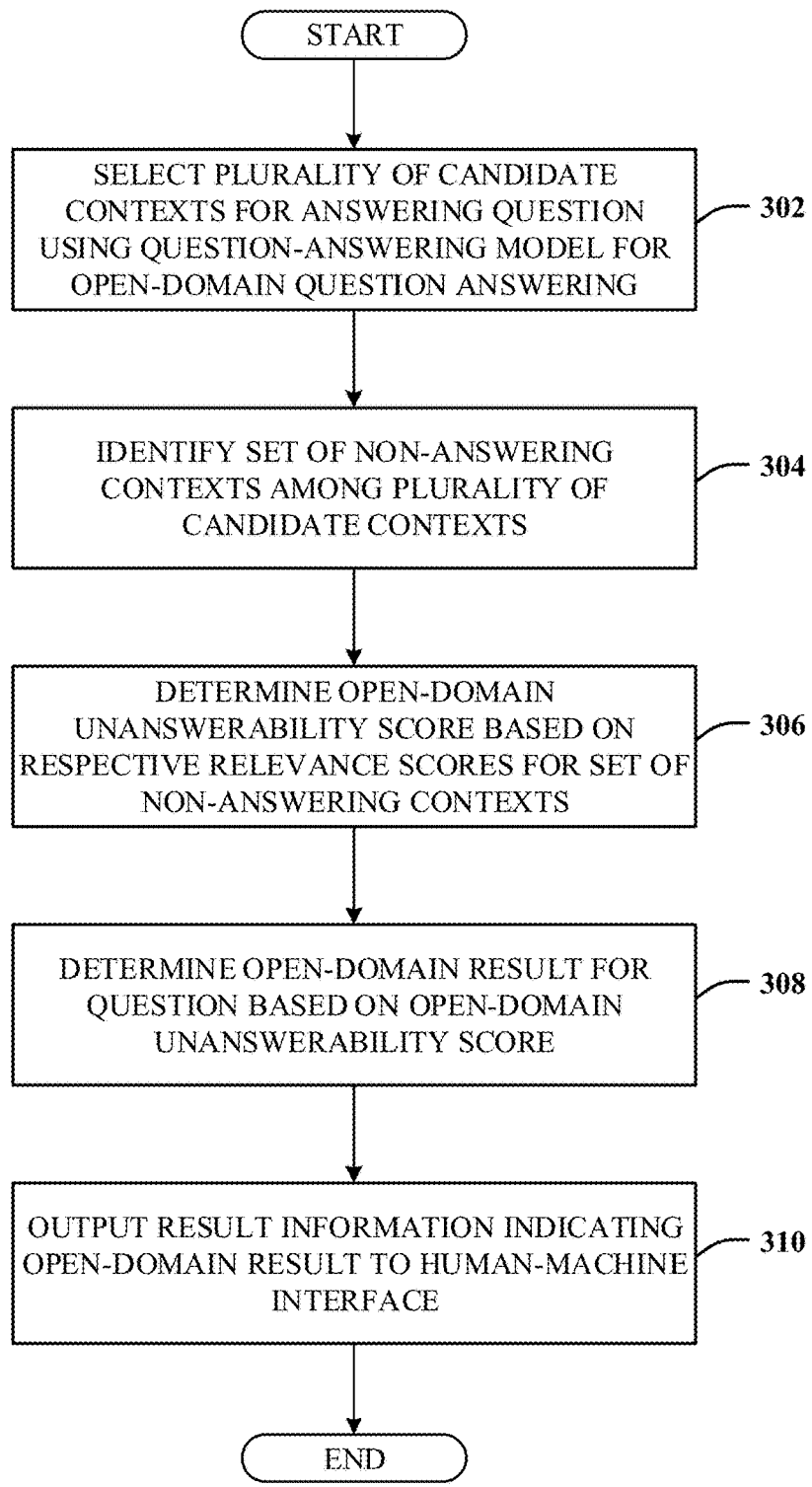
FIG. 3 is a block diagram of an example process flow.

FIG. 3 is a block diagram of a process flow 300, which may be representative of operations executed in various implementations. As shown in logic flow 300, a plurality of candidate contexts may be selected at 302 for answering a question using a question-answering model for open-domain question answering. For example, QA programming 220 of FIG. 2 may select candidate contexts 264-1 to 264-C. At 304, a set of non-answering contexts may be identified among the set of candidate contexts. For example, QA programming 220 of FIG. 2 may identify non-answering contexts 266-1 to 266-N among candidate contexts 264-1 to 264-C.

At 306, an open-domain unanswerability score may be determined based on respective relevance scores for each of the set of non-answering contexts. For example, QA programming 220 of FIG. 2 may determine an open-domain unanswerability score $\tilde{s}_U$ for question 221 based in part on non-answering context relevance scores 226-1 to 226-N. At 308, an open-domain result may be determined for the question based on the open-domain unanswerability score determined at 306. For example, QA programming 220 of FIG. 2 may determine open-domain result 240 based in part on an open-domain unanswerability score $\bar{s}_u$ for question 221. At 310, result information that indicates the open-domain result may be outputted to a human-machine interface. For example, device 200 of FIG. 2 may output result information indicating open-domain result 240 to HMI 205.

Figure 4:
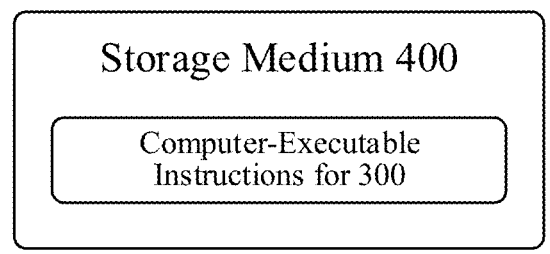
FIG. 4 is a block diagram of an example storage medium.

FIG. 4 illustrates an example storage medium 400. Storage medium 400 may be any non-transitory computer-readable storage medium or machine-readable storage medium, such as an optical, magnetic or semiconductor storage medium. In various implementations, storage medium 400 may be an article of manufacture. In some implementations, storage medium 400 may store computer-executable instructions, such as computer-executable instructions to implement logic flow 300. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

Figure 5:
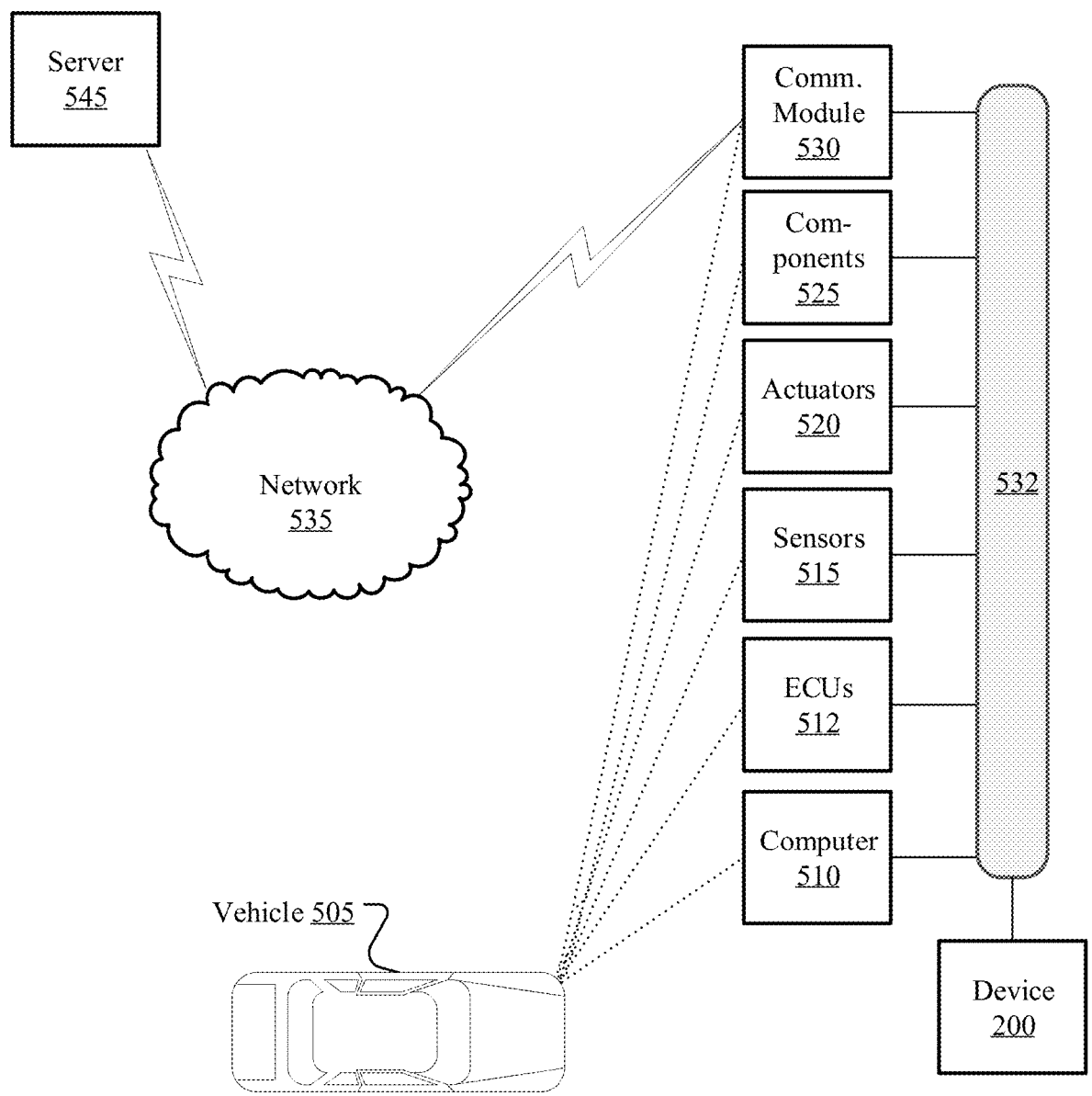
FIG. 5 is a block diagram of an example system including a vehicle.

FIG. 5 is a block diagram of an example vehicle system 500. The system 500 includes a vehicle 505, which is a land vehicle such as a car, truck, etc. The vehicle 505 includes device 200 of FIG. 2. Vehicle 505 also includes a computer 510, electronic control units (ECUs) 512, vehicle sensors 515, actuators 520 to actuate various vehicle components 525, a communications module 530, and a vehicle network 532. Communications module 530 allows vehicle 505 to communicate with a server 545 via a network 535.

The computer 510 includes a processor and a memory. The memory includes one or more forms of computer-readable media, and stores instructions executable by the computer 510 for performing various operations, including as disclosed herein.

The computer 510 may operate vehicle 505 in an autonomous, a semi-autonomous mode, or a non-autonomous (manual) mode, i.e., can control and/or monitor operation of the vehicle 505, including controlling and/or monitoring components 525. For purposes of this disclosure, an autonomous mode is defined as one in which each of vehicle propulsion, braking, and steering are controlled by the computer 510; in a semi-autonomous mode the computer 510 controls one or two of vehicle propulsion, braking, and steering; in a non-autonomous mode a human operator controls each of vehicle propulsion, braking, and steering.

The computer 510 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 510, as opposed to a human operator, is to control such operations. Additionally, the computer 510 may be programmed to determine whether and when a human operator is to control such operations.

The computer 510 may include or be communicatively coupled to, e.g., via vehicle network 532 as described further below, more than one processor, e.g., included in ECUs 512 or the like included in the vehicle 505 for monitoring and/or controlling various vehicle components 525, e.g., a powertrain controller, a brake controller, a steering controller, etc. Further, the computer 510 may communicate, via communications module 530, with a navigation system that uses the Global Position System (GPS). As an example, the computer 510 may request and receive location data of the vehicle 505. The location data may be in a conventional format, e.g., geo-coordinates (latitudinal and longitudinal coordinates).

Vehicle network 532 is a network via which messages can be exchanged between various devices in vehicle 505. Computer 510 can be generally programmed to send and/or receive, via vehicle network 532, messages to and/or from other devices in vehicle 505 (e.g., any or all of ECUs 512, sensors 515, actuators 520, components 525, communications module 530, a human machine interface (HMI), etc.). Additionally or alternatively, messages can be exchanged among various such other devices in vehicle 505 via vehicle network 532. In cases in which computer 510 actually comprises a plurality of devices, vehicle network 532 may be used for communications between devices represented as computer 510 in this disclosure. Further, as mentioned below, various controllers and/or vehicle sensors 515 may provide data to the computer 510.

In some implementations, vehicle network 532 can be a network in which messages are conveyed via a vehicle communications bus. For example, vehicle network can be a controller area network (CAN) in which messages are conveyed via a CAN bus, or a local interconnect network (LIN) in which messages are conveyed via a LIN bus.

In some implementations, vehicle network 532 can be a network in which messages are conveyed using other wired communication technologies and/or wireless communication technologies (e.g., Ethernet, WiFi, Bluetooth, etc.). Additional examples of protocols that may be used for communications over vehicle network 532 in some implementations include, without limitation, Media Oriented System Transport (MOST), Time-Triggered Protocol (TTP), and FlexRay.

In some implementations, vehicle network 532 can represent a combination of multiple networks, possibly of different types, that support communications among devices in vehicle 505. For example, vehicle network 532 can include a CAN in which some devices in vehicle 505 communicate via a CAN bus, and a wired or wireless local area network in which some device in vehicle 505 communicate according to Ethernet or Wi-Fi communication protocols.

Vehicle sensors 515 may include a variety of devices such as are known to provide data to the computer 510. For example, the vehicle sensors 515 may include Light Detection and Ranging (lidar) sensor(s) 515, etc., disposed on a top of the vehicle 505, behind a vehicle 505 front windshield, around the vehicle 505, etc., that provide relative locations, sizes, and shapes of objects and/or conditions surrounding the vehicle 505. As another example, one or more radar sensors 515 fixed to vehicle 505 bumpers may provide data to provide and range velocity of objects (possibly including second vehicles), etc., relative to the location of the vehicle 505. The vehicle sensors 515 may further include camera sensor(s) 515, e.g., front view, side view, rear view, etc., providing images from a field of view inside and/or outside the vehicle 505.

Actuators 520 are implemented via circuitry, chips, motors, or other electronic and or mechanical components that can actuate various vehicle subsystems in accordance with appropriate control signals as is known. The actuators

520 may be used to control components 525, including braking, acceleration, and steering of a vehicle 505.

In the context of the present disclosure, a vehicle component 525 is one or more hardware components adapted to perform a mechanical or electro-mechanical function or operation—such as moving the vehicle 505, slowing or stopping the vehicle 505, steering the vehicle 505, etc. Non-limiting examples of components 525 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 510 may be configured for communicating via communication module 530 with devices outside of the vehicle 505, e.g., through vehicle-to-vehicle (V2V) or vehicle-to-infrastructure (V2X) wireless communications to another vehicle, to (typically via the network 535) a remote server 545. The communications module 530 could include one or more mechanisms by which the computer 510 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 530 include cellular, Bluetooth®, IEEE 802.11, dedicated short range communications (DSRC), and/or wide area networks (WAN), including the Internet, providing data communication services.

The network 535 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC) and cellular V2V (CV2V), cellular V2X (CV2X), etc.), local area networks (LAN) and/or wide area networks (WAN), including the Internet, providing data communication services.

Computer 510 can receive and analyze data from sensors 515 substantially continuously, periodically, and/or when instructed by a server 545, etc. Further, object classification or identification techniques can be used, e.g., in a computer 510 based on lidar sensor 515, camera sensor 515, etc., data, to identify a type of object, e.g., vehicle, person, rock, pothole, bicycle, motorcycle, etc., as well as physical features of objects.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system, comprising:
an input interface to receive input indicating a question;
a communication module to establish a communication link with an access network, wherein the communication link provides connectivity to one or more packet data networks (PDNs) via the access network; and
a computer coupled to the input interface and the communication module, the computer including a processor and a memory, the memory storing instructions executable by the processor to:
execute an information retrieval procedure including:
accessing an open-domain context search space of the one or more PDNs;
retrieve, from among a plurality of contexts of the open-domain context search space, a plurality of candidate contexts for answering the question using a question-answering model for open-domain question answering;
identify a set of non-answering contexts among the plurality of candidate contexts, wherein each of the set of non-answering contexts is a respective context for which the question-answering model predicts the question to be unanswerable;
determine an open-domain unanswerability score for the question based on respective relevance scores for the set of non-answering contexts;
determine an open-domain result for the question based on the open-domain unanswerability score for the question;
determine a set of adjusted unanswerability scores including a respective adjusted unanswerability score for each of the set of non-answering contexts;
determine the open-domain unanswerability score for the question based on the set of adjusted unanswerability scores; and
output result information indicating the open-domain result for the question.

2. The system of claim 1, the memory storing instructions executable by the processor to determine each of the set of adjusted unanswerability scores based on:
a normalized unanswerability score for a respective non-answering context among the set of non-answering contexts; and a relevance score for the respective non-answering context.

3. The system of claim 2, the memory storing instructions executable by the processor to determine each of the set of adjusted unanswerability scores as a weighted average of the normalized unanswerability score for the respective non-answering context and the relevance score for the respective non-answering context.

4. The system of claim 1, the memory storing instructions executable by the processor to identify a smallest adjusted unanswerability score among the set of adjusted unanswerability scores as the open-domain unanswerability score for the question.

5. The system of claim 1, the memory storing instructions executable by the processor to determine the open-domain result for the question based on a comparison of the open-domain unanswerability score with a threshold value.

6. The system of claim 5, the memory storing instructions executable by the processor to, in response to a determination that the open-domain unanswerability score exceeds the threshold value:
identify an unanswerability result as the open-domain result for the question; and
arrange the result information to indicate the unanswerability result.

7. The system of claim 5, the memory storing instructions executable by the processor to, in response to a determination that the open-domain unanswerability score does not exceed the threshold value:
identify an answer span as the open-domain result for the question, wherein the answer span is contained in an answering context among the plurality of candidate contexts; and
arrange the result information to indicate the answer span.

8. The system of claim 1, the memory storing instructions executable by the processor to select the plurality of candidate contexts from among the plurality of contexts of the open-domain context search space based on respective relevance scores for the plurality of candidate contexts.

9. The system of claim 1, the memory storing instructions executable by the processor to output the result information to a human-machine interface (HMI).

10. A method, comprising:
receiving input indicating a question;
establishing a communication link with an access network, wherein the communication link provides connectivity to one or more packet data networks (PDNs) via the access network;
executing an information retrieval procedure including:
accessing an open-domain context search space of the one or more PDNs;
retrieving, from among a plurality of contexts of the open-domain context search space, a plurality of candidate contexts for answering the question using a question-answering model for open-domain question answering;
identifying a set of non-answering contexts among the plurality of candidate contexts, wherein each of the set of non-answering contexts is a respective context for which the question-answering model predicts the question to be unanswerable;
determining an open-domain unanswerability score for the question based on respective relevance scores for the set of non-answering contexts;
determining an open-domain result for the question based on the open-domain unanswerability score for the question;
determining a set of adjusted unanswerability scores including a respective adjusted unanswerability score for each of the set of non-answering contexts;
determining the open-domain unanswerability score for the question based on the set of adjusted unanswerability scores; and
outputting result information indicating the open-domain result for the question.

11. The method of claim 10, comprising determining each of the set of adjusted unanswerability scores based on:
a normalized unanswerability score for a respective non-answering context among the set of non-answering contexts; and
a relevance score for the respective non-answering context.

12. The method of claim 11, comprising determining each of the set of adjusted unanswerability scores as a weighted average of the normalized unanswerability score for the respective non-answering context and the relevance score for the respective non-answering context.

13. The method of claim 10, comprising identifying a smallest adjusted unanswerability score among the set of adjusted unanswerability scores as the open-domain unanswerability score for the question.

14. The method of claim 10, comprising determining the open-domain result for the question based on a comparison of the open-domain unanswerability score with a threshold value.

15. The method of claim 14, comprising, in response to a determination that the open-domain unanswerability score exceeds the threshold value:
identifying an unanswerability result as the open-domain result for the question; and
arranging the result information to indicate the unanswerability result.

16. The method of claim 14, comprising, in response to a determination that the open-domain unanswerability score does not exceed the threshold value:
identifying an answer span as the open-domain result for the question, wherein the answer span is contained in an answering context among the plurality of candidate contexts; and
arranging the result information to indicate the answer span.

17. The method of claim 10, comprising selecting the plurality of candidate contexts from among the plurality of contexts of the open-domain context search space based on respective relevance scores for the plurality of candidate contexts.

18. The method of claim 10, comprising outputting the result information to a human-machine interface (HMI).

19. A system, comprising:
an input interface to receive input indicating a question;
a communication module to establish a communication link with an access network, wherein the communication link provides connectivity to one or more packet data networks (PDNs) via the access network; and
a computer coupled to the input interface and the communication module, the computer including a processor and a memory, the memory storing instructions executable by the processor to:
execute an information retrieval procedure including:
accessing an open-domain context search space of the one or more PDNs;
retrieving, from among a plurality of contexts of the open-domain context search space, a plurality of candidate contexts for answering the question using a question-answering model for open-domain question answering;

identifying a set of non-answering contexts among the plurality of candidate contexts, wherein each of the set of non-answering contexts is a respective context for which the question-answering model predicts the question to be unanswerable;

selecting the plurality of candidate contexts from among the plurality of contexts of the open-domain context search space based on respective relevance scores for the plurality of candidate contexts;

determining an open-domain unanswerability score for the question based on respective relevance scores for the set of non-answering contexts;

determining an open-domain result for the question based on the open-domain unanswerability score for the question; and outputting result information indicating the open-domain result for the question.

20. The system of claim 19, the memory storing instructions executable by the processor to:

determine a set of adjusted unanswerability scores including a respective adjusted unanswerability score for each of the set of non-answering contexts; and determine the open-domain unanswerability score for the question based on the set of adjusted unanswerability scores.

21. The system of claim 20, the memory storing instructions executable by the processor to determine each of the set of adjusted unanswerability scores based on:

a normalized unanswerability score for a respective non-answering context among the set of non-answering contexts; and a relevance score for the respective non-answering context.

22. The system of claim 20, the memory storing instructions executable by the processor to identify a smallest adjusted unanswerability score among the set of adjusted unanswerability scores as the open-domain unanswerability score for the question.

23. The system of claim 19, the memory storing instructions executable by the processor to determine the open-domain result for the question based on a comparison of the open-domain unanswerability score with a threshold value.

24. The system of claim 19, the memory storing instructions executable by the processor to determine the open-domain result for the question based on a comparison of the open-domain unanswerability score with a threshold value.

25. The system of claim 19, the memory storing instructions executable by the processor to output the result information to a human-machine interface (HMI).

* * * * *